(12) United States Patent
Topf et al.

(10) Patent No.: US 10,950,360 B2
(45) Date of Patent: Mar. 16, 2021

(54) METHOD FOR TREATING WASTE WATER FROM THE DECONTAMINATION OF A METAL SURFACE, WASTE-WATER TREATMENT DEVICE AND USE OF THE WASTE-WATER TREATMENT DEVICE

(71) Applicant: Framatome GmbH, Erlangen (DE)

(72) Inventors: Christian Topf, Forcheim (DE); Luis Sempere Belda, Erlangen (DE)

(73) Assignee: FRAMATOME GMBH, Erlangen (DE)

(*) Notice: Subject to any disclaimer, the term of this patent is extended or adjusted under 35 U.S.C. 154(b) by 169 days.

(21) Appl. No.: 16/085,072

(22) PCT Filed: Mar. 1, 2017

(86) PCT No.: PCT/EP2017/054817
§ 371 (c)(1),
(2) Date: Sep. 14, 2018

(87) PCT Pub. No.: WO2017/157668
PCT Pub. Date: Sep. 21, 2017

(65) Prior Publication Data
US 2019/0074099 A1 Mar. 7, 2019

(30) Foreign Application Priority Data
Mar. 16, 2016 (DE) ...................... 10 2016 104 846.1

(51) Int. Cl.
*C02F 1/42* (2006.01)
*C02F 1/70* (2006.01)
*C02F 9/00* (2006.01)
*G21F 9/00* (2006.01)
*G21F 9/12* (2006.01)
(Continued)

(52) U.S. Cl.
CPC .................. *G21F 9/12* (2013.01); *C02F 1/70* (2013.01); *C02F 9/00* (2013.01); *G21F 9/004* (2013.01);
(Continued)

(58) Field of Classification Search
CPC ........ C02F 1/70; C02F 9/00; C02F 2001/425; C02F 2001/427; C02F 2101/203;
(Continued)

(56) References Cited

U.S. PATENT DOCUMENTS

| 3,873,362 A | 3/1975 | Mihram et al. |
| 4,756,768 A | 7/1988 | Bertholdt et al. |

(Continued)

FOREIGN PATENT DOCUMENTS

| DE | 3413868 A1 | 10/1985 |
| DE | 19818772 A1 | 11/1999 |

(Continued)

OTHER PUBLICATIONS

PCT International Search Report and Written Opinion dated Jun. 13, 2017 from corresponding Application No. PCT/EP2017/054817, 16 pages.

(Continued)

*Primary Examiner* — Lucas A Stelling
(74) *Attorney, Agent, or Firm* — Dilworth IP, LLC (57) ABSTRACT

A method for treating waste water from the decontamination of a metal surface in a primary coolant circuit of a nuclear reactor comprises discharging a predetermined amount of an oxidation solution from the primary coolant circuit into a reduction zone connected to the primary coolant circuit and reacting the oxidation solution with a reducing agent to form a reaction solution that is freed of oxidizing agent, and passing the reaction solution over an ion-exchange resin in order to form a desalinated solution, and returning the desalinated solution to the primary coolant and/or disposing of the desalinated solution. A waste water treatment apparatus for carrying out the method is also provided.

19 Claims, 2 Drawing Sheets

(51) Int. Cl.
    *C02F 103/02*         (2006.01)
    *C02F 101/20*         (2006.01)

(52) U.S. Cl.
    CPC .. *C02F 2001/425* (2013.01); *C02F 2001/427* (2013.01); *C02F 2101/203* (2013.01); *C02F 2101/206* (2013.01); *C02F 2103/023* (2013.01); *C02F 2303/18* (2013.01)

(58) Field of Classification Search
    CPC .......... C02F 2101/206; C02F 2103/023; C02F 2103/18; G12F 9/004; G12F 9/12
    See application file for complete search history.

(56) References Cited

U.S. PATENT DOCUMENTS

| | | |
|---|---|---|
| 2012/0138086 A1 | 6/2012 | Gassen et al. |
| 2013/0220366 A1 | 8/2013 | Gassen et al. |
| 2015/0364226 A1 | 12/2015 | Sempere Belda et al. |

FOREIGN PATENT DOCUMENTS

| | | | |
|---|---|---|---|
| DE | 102009047524 A1 | 6/2011 | |
| DE | 102010028457 A1 | 11/2011 | |
| DE | 102013100933 B3 | 3/2014 | |
| EP | 0406098 A1 | 1/1991 | |
| WO | WO-2016124240 A1 * | 8/2016 | ............... G21F 9/12 |

OTHER PUBLICATIONS

PCT International Preliminary Report on Patentability dated Feb. 28, 2018 from corresponding Application No. PCT/EP2017/054817, 8 pages.

\* cited by examiner

METHOD FOR TREATING WASTE WATER FROM THE DECONTAMINATION OF A METAL SURFACE, WASTE-WATER TREATMENT DEVICE AND USE OF THE WASTE-WATER TREATMENT DEVICE

The invention relates to a method for treating waste water from the decontamination of a metal surface in a primary coolant circuit of a nuclear reactor, a waste water treatment apparatus, as well as the use of said waste water treatment apparatus in a method for decontaminating a metal surface in a primary coolant circuit of a nuclear reactor.

BACKGROUND OF THE INVENTION

Nuclear reactors comprise a reactor vessel in which fuel elements containing nuclear fuel are arranged. Connected to the reactor vessel is a piping system which forms the primary coolant circuit and is connected to at least one coolant pump and, in the case of a pressurized-water reactor (PWR) or heavy-water reactor, to a steam generator.

The piping system of the coolant circuit is typically made of stainless austenitic FeCrNi steels. The heat exchanger surfaces of the steam generators may be formed of Ni alloys. Further, cobalt steels and/or casting materials are used for coolant pumps and other components. Under the conditions of power operation of a nuclear reactor, all these materials show some solubility in water. Metal ions leached from the alloys enter the coolant stream and reach the reactor vessel where they are partly converted by the neutron radiation prevailing there into radioactive nuclides. The nuclides are in turn distributed by the coolant stream throughout the coolant system and are incorporated into oxide layers which form on the metal surfaces of the coolant system during operation of the nuclear reactor.

With increasing time of operation, the deposited activated nuclides accumulate, so that the radioactivity or the dose rate on the components of the coolant system increases. Depending on the type of alloy used for a component, the oxide layers contain, as main constituent, iron oxide having divalent and trivalent iron as well as oxides of other metals such as chromium and nickel, which are present as alloy constituents in the abovementioned materials.

Before inspection, maintenance, repair and dismantling measures can be carried out on the components of the reactor systems, a reduction in the radioactive radiation of the respective components is required to decrease exposure to radiation for the personnel. This is done by removing the oxide layer present on the surfaces of the components as completely as possible by means of a decontamination method. The decontamination may be performed as a full system decontamination (FSD). For this, either the entire coolant system or a part of the system separated by valves is filled with an aqueous cleaning solution and decontaminated. In a partial decontamination, individual components of the system can be treated in a separate vessel containing the cleaning solution.

In the case of a full system decontamination (FSD), it may be expedient to circulate the treatment solutions in the primary coolant circuit using the power plant's own pumps, such as the main coolant pumps, and to use the power plant's own equipment present in the primary coolant circuit for pressure and temperature control. For operation of the coolant pumps, the pumps need to be supplied with seal water for internal cooling of the gasket parts, which seal water is delivered into the primary coolant. The seal water needed for this is provided either via the in-plant operational systems in an internal seal water circuit or through an external deionized water supply. For procedural reasons, the external seal water supply takes place predominantly during the oxidation phase of the decontamination process. In this process, external seal water is fed to the primary coolant circuit preferably in deionized water quality. Since only a very limited amount of the externally fed seal water can be received in the closed primary coolant circuit during the system decontamination, an amount of treatment solution that corresponds to the amount of fed seal water needs to be discharged from the system as waste water. The discharged treatment solution is typically concentrated to a small volume in an evaporator during operation to keep the amount of radioactive waste water small.

The amount of external seal water introduced into the coolant system during the oxidation phase of a full system decontamination may be several $m^3/h$. Large evaporator capacities must therefore be provisioned to evaporate the involved amounts of up to several hundred cubic meters of treatment solution. In addition to the high investment costs for the evaporator, further costs are incurred due to the high energy consumption during the evaporation process. In heavy-water reactors, in which heavy water is used as the coolant, additional costs are incurred due to the fact that only expensive heavy water can be used as seal water and substantial heavy water losses may occur during evaporation of the treatment solution when using conventional technology. Therefore, a complete system decontamination cannot be carried out economically in this type of reactor.

SUMMARY OF THE INVENTION

The object of the invention is to provide a method for treating the waste water produced during the decontamination of a metal surface in the primary coolant circuit of a nuclear reactor in a more cost-efficient manner and with a reduced production of radioactive waste.

To achieve this object, a method for treating waste water from decontamination of a metal surface in a primary coolant circuit of a nuclear reactor is provided, said method comprising the following steps:
 a) an oxidizing agent is introduced into the primary coolant circuit to form an oxidation solution, and the oxidation solution is circulated in the primary coolant circuit to contact the oxidation solution with the metal surface, and
 b) during or after step a), a predetermined amount of the oxidation solution is discharged from the primary coolant circuit into a reduction zone connected to the primary coolant circuit,
 c) in the reduction zone, the oxidizing agent is reacted with a reducing agent to form a reaction solution freed of the oxidizing agent,
 d) the reaction solution is passed over an ion-exchange resin to form a desalinated solution, and
 e) the desalinated solution is returned into the primary coolant and/or stored temporarily and/or disposed of.

Step a) of the method according to the invention for treating waste water corresponds to the oxidation step within the conventional application of a decontamination method. Through the method according to the invention, the oxidation solution discharged from the primary coolant circuit during or after execution of the oxidation step is processed and can be recycled in the decontamination process without requiring complicated postprocessing and/or evaporation. Further, the method generates only small amounts of waste compared with the prior art, so that the method offers not only economic but also ecological advantages.

The inventors have found that a waste water treatment subsequent to the oxidation step of the decontamination method is fit to remove the waste water volume introduced into the cooling system through operation of the coolant pumps from the system and to process it such that it can be returned into the cooling system or disposed of in a cost-efficient manner. The treatment of the oxidizing agent present in the discharged portion of the primary coolant with a reducing agent includes a generally rapid redox reaction that can be controlled such that an effective conversion of the reaction partners into defined decomposition products is achieved in a short time. Due to its low ion charge, the resulting reaction solution is suitable for processing with ion exchangers, which are needed to carry out the decontamination method anyway and thus are available as in-plant equipment. The creation of additional radioactive waste such as evaporator concentrate can thus be reduced or avoided.

"Freed of the oxidizing agent" in the sense of the invention means that the concentration of the oxidizing agent in the reaction solution has a value that is uncritical for the ion-exchange resin and is preferably below 5 mg/kg. The reducing agent is preferably used in slight excess to ensure the complete conversion of the oxidizing agent.

$Ce^{4+}$, permanganates such as permanganic acid and alkali metal salts thereof, $H_2S_2O_8$ and salts thereof or $O_3$ may be used as the oxidizing agent. According to a preferred embodiment, the oxidizing agent is a permanganate, preferably permanganic acid. Permanganates are easily available and are already technologically proven as oxidizing agents for decontamination methods.

According to a preferred embodiment, the reducing agent employed in the method according to the invention for treating waste water is an aliphatic dicarboxylic acid such as ascorbic acid, citric acid or oxalic acid and mixtures thereof, particularly preferably oxalic acid. Oxalic acid is known to be a suitable complexing agent for the metal ions detached from the oxide layers on the metal surface in the oxidation step. Also, oxalic acid can be removed from the reaction solution without residues since only carbon dioxide and water are created as the reaction products.

The primary coolant circuit may comprise at least one coolant pump having a seal water supply. The seal water fed to the coolant pump is delivered into the primary coolant. The predetermined amount of the oxidation solution that is discharged from the primary coolant circuit during or after the oxidation step preferably corresponds to the amount of the seal water fed to the primary coolant. A volumetric flow rate of the oxidation solution discharged into the reduction zone particularly preferably corresponds to a volumetric flow rate of the seal water delivered into the primary coolant by the coolant pump during the oxidation step. Through this, the amount of primary coolant in the cooling system is kept constant and a defined flow rate is set in the reduction zone. Moreover, this allows ensuring a continuous processing of the discharged oxidation solution and at the same time a constant filling volume in the primary coolant circuit.

In an alternative embodiment, the oxidation solution discharged into the reduction zone may be stored temporarily in a buffer vessel and may be processed in the reduction zone in batches.

More preferably, the volume of the reduction zone is adapted to a reaction time of the reaction of the oxidizing agent with the reducing agent so as to assure an essentially complete reaction of the oxidizing agent with the reducing agent in the reaction zone before the reaction solution freed of the oxidizing agent is fed to the ion exchanger. In this manner, an essentially complete conversion of the oxidizing agent can be assured with little effort without requiring continuous monitoring and control of the reduction zone.

A further subject matter of the invention is a waste water treatment apparatus for treating waste water from decontamination of a metal surface in a primary coolant circuit of a nuclear reactor, said apparatus comprising:
  a discharge device provided for discharging a predetermined amount of the primary coolant including an oxidizing agent from the primary coolant circuit,
  a reduction zone that is connected to the discharge device and comprises a dosing station for introducing a reducing agent into the predetermined amount of the discharged primary coolant, and that is provided for the reaction of the reducing agent with the oxidizing agent in the primary coolant to form a reaction solution, and
  at least one ion exchanger connected to the reduction zone for desalinating the reaction solution.

The waste water treatment apparatus makes it possible to process and desalinate the oxidation solution used in the decontamination of the metal surfaces in a primary coolant circuit of a nuclear reactor without employing an evaporator, whereby the energy consumption and the produced radioactive waste are reduced significantly.

In an advantageous embodiment, the reduction zone comprises a reaction vessel, which is optionally operated continuously. By providing an additional reaction vessel, the reaction of the oxidizing agent with the reducing agent can be monitored and controlled more easily. Also, the waste water treatment apparatus can be designed more flexibly and can be adapted to the requirements of the respective nuclear reactor. A continuously operated reaction vessel has the additional advantage that the oxidation solution can be processed constantly and thus can constantly be discharged from the primary coolant circuit and can be stored as deionized water or returned as seal water after processing in the ion exchanger.

The reaction vessel is an optionally continuously operated stirred-tank reactor, which has the advantage that the amount of reducing agent introduced into the oxidation solution as well as the residence time of the reaction solution in the stirred-tank reactor can be controlled to assure an essentially complete reaction of the oxidizing agent with the reducing agent.

According to an advantageous embodiment, the reduction zone further comprises a buffer vessel connected to the stirred-tank reactor. The buffer vessel enables a continuous discharge of the oxidation solution from the cooling system even if the stirred-tank reactor is operated intermittently. Alternatively, the buffer vessel may also be a further stirred-tank reactor connected parallel to the first stirred-tank reactor. The volumes of the stirred-tank reactors and/or the buffer vessel are matched such that the volume of the oxidation solution discharged from the coolant system can be fully received in one of the vessels, while the reaction of the oxidizing agent with the reducing agent is carried out in the other vessel.

According to another advantageous embodiment, the reaction vessel comprises a tubular-flow reactor that allows continuous operation. In this case, a section of the reduction zone can be designed as a tubular-flow reactor.

The length of the tubular-flow reactor can be determined depending on the diameter of the tubular-flow reactor and the flow velocity of the reaction solution. The length of the tubular-flow reactor is preferably dimensioned such that a residence time of the reaction solution in the tubular-flow reactor is achieved in which the oxidizing agent essentially completely reacts with the reducing agent to form the reaction solution freed of oxidizing agent. In this manner, additional monitoring and control equipment can be dispensed with, whereby the process safety is increased and the costs are reduced.

Another subject matter of the invention is the use of the waste water treatment apparatus according to the invention for carrying out the method according to the invention for treating waste water, and preferably the use of the waste water treatment apparatus in a decontamination method in which a metal surface in a primary coolant circuit of a nuclear reactor having a layer including one or more metal oxides and radioisotopes is decontaminated.

The decontamination method may comprise one or more treatment cycles, each including an oxidation step in which an oxidizing agent is introduced into a primary coolant in the primary coolant circuit to form an oxidation solution, which oxidation solution is circulated in the primary coolant circuit to contact the oxidation solution with the metal surface; a reduction step in which a reducing agent is introduced into the oxidation solution and the oxidizing agent in the oxidation solution is reduced; and a decontamination step, wherein the metal surface treated in the oxidation step is contacted with a decontaminating agent to dissolve at least a part of the metal oxides and radioisotopes in the primary coolant to form a decontamination solution. According to the invention, a predetermined amount of the oxidation solution formed in the oxidation step is discharged into the waste water treatment apparatus.

The method according to the invention and the waste water treatment apparatus according to the invention are particularly preferably suitable for use in the full system decontamination of a pressurized-water reactor, a boiling-water reactor, or a heavy-water reactor. Since the chemical constitution and composition as well as the thickness of the oxide layer may vary over the entire decontamination region in an FSD and the total surface area of the decontamination region to be treated is very large in an FSD, particularly long oxidation times are necessary to open up the oxide layers deposited on the metal surfaces. The method according to the invention in particular assists in reducing the amount of produced radioactive waste water. In heavy-water reactors, the method according to the invention enables recovery of the expensive heavy water without high evaporation losses and further processing steps.

Further advantages and features will become apparent from the following description in connection with the accompanying drawing. In the schematic drawing:

DETAILED DESCRIPTION OF THE INVENTION

Figure 1:
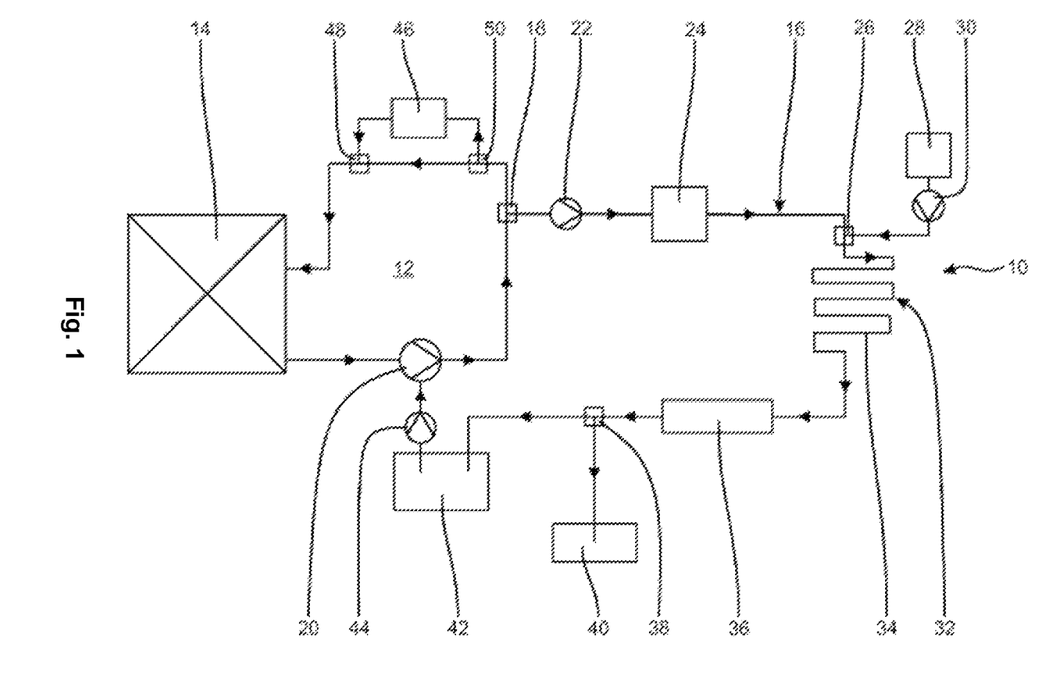
FIG. 1 is a schematic view of a waste water treatment apparatus according to the invention having a tubular-flow reactor.

The waste water treatment apparatus 10 schematically illustrated in FIG. 1 is connected to a primary coolant circuit 12 of a nuclear reactor 14 and serves for processing waste water from the decontamination of a metal surface in the primary coolant circuit 12 having a layer including one or more metal oxides and radioisotopes. The primary coolant circuit 12 comprises all systems and components that are in contact with the primary coolant in power operation of the nuclear reactor 14. This particularly but not exclusively includes the coolant pipes, the reactor vessel, the steam generators and auxiliary systems such as the emergency and residual heat removal system, the volume regulation system and the reactor water cleaning system (not shown).

The primary coolant circuit 12 further comprises the main coolant pump 20 provided for circulation of the primary coolant and/or the oxidation solution in the oxidation step. It is also possible to operate multiple main coolant pumps instead of one main cooling pump 20. In addition, or as an alternative to the main coolant pump 20, it is also possible to employ the pumps of the auxiliary systems, in particular the pumps of the emergency and residual heat removal system (not shown), to circulate the oxidation solution in the primary coolant circuit 12. The waste heat produced by the coolant pumps may be used to bring the oxidation solution to the desired reaction temperature. At least one of the coolant pumps has a seal water supply.

Although only one loop of the primary coolant circuit 12 is shown in FIG. 1, it may be assumed that the waste water treatment apparatus 10 according to the invention can also be used in nuclear reactors having a primary coolant circuit 12 with two or more loops.

The nuclear reactor 14 may be constructed in particular as a pressurized-water reactor, a boiling-water reactor or a heavy-water reactor.

The waste water treatment apparatus 10 connected to the primary coolant circuit 12 comprises a reduction zone 16 and a discharge device 18, where a portion of the oxidation solution is discharged from the primary coolant circuit 12 into the reduction zone 16 as waste water. The discharge device 18 may comprise, for example, a three-way valve and/or a fitting that is directly integrated into a decontamination region of the primary coolant circuit 12, with or without a regulating valve. This is advantageous in that both the volumetric flow rate in the primary coolant circuit 12 and the volumetric flow rate of the oxidation solution discharged into the reduction zone 16 can be regulated.

Provided in the reduction zone 16 is a pump 22 with the aid of which the portion of the oxidation solution discharged from the primary coolant circuit at the discharge device 18 is pumped through the reduction zone 16.

A flow meter 24, with which the volumetric flow rate of the oxidation solution in the reduction zone 16 can be determined and controlled, is arranged subsequent to the pump 22.

Provided downstream of the pump 22 is a dosing station 26, where a reducing agent can be introduced from a dosing device 28 into the reduction zone 16 by means of a dosing pump 30.

Provided in the flow direction behind the dosing station 26 is a reaction section 32, in which the reducing agent is reacted with the oxidizing agent in the oxidation solution to form a reaction solution.

In the embodiment shown in FIG. 1, the reaction section 32 has a tubular-flow reactor 34 having a length that is dimensioned such that a residence time of the reaction solution in the tubular-flow reactor 34 is achieved that is sufficient for the oxidizing agent to essentially completely react with the reducing agent, so that the reaction solution is freed of the oxidizing agent when exiting the tubular-flow reactor. The length of the tubular-flow reactor 34 is determined depending on the reactor diameter and the flow velocity of the reaction solution.

Connected to the reaction section 32 of the reduction zone 16 is at least one ion exchanger 36 in which at least the radioactive components contained in the reaction solution freed of the oxidizing agent, preferably the metal ions contained therein, are bound and thus the reaction solution is desalinated and cleaned. The waste water processed by desalination is particularly preferably provided in deionized water quality.

Freed at least of radioactive components through desalination, the solution exiting the ion exchanger 36 may optionally be discharged at a connection point 38 and directly fed to the waste water 40 and/or be passed on as deionized water to an intermediate storage vessel 42 for the seal water pump 44 or to another storage vessel for deionized water (not shown). The deionized water received in said other storage vessel may be used, for example, to compensate losses of primary coolant. This embodiment is particularly suitable for the decontamination of heavy-water reactors, in which the losses of heavy water should be kept small already for economic reasons.

From the intermediate storage 42, the desalinated solution can be fed as external seal water to the main coolant pump 20 by means of the seal water pump 44 and in this manner is again available to the primary coolant circuit 12 as primary coolant or as solvent for further treatment chemicals.

The primary coolant circuit 12 may have a further external decontamination system 46 connected to it via connection points 48, 50, which decontamination system may serve to monitor and control the individual steps of the decontamination method. The external decontamination system 46 may have a modular design and may in particular include one or more storage vessels for treatment chemicals such as oxidizing agent and decontaminating agent for carrying out the decontamination, dosing devices for feeding the treatment chemicals into the primary coolant circuit 12, pumps, heaters, filter devices, sampling systems, one or more ion exchangers and a UV-reactor for photocatalytic decomposition of the decontaminating agent, as well as interfaces for remote monitoring and various sensors for determining substance-specific concentrations, pH, activity of the treatment solution, and other method parameters. Via the connection points 48, 50, the external decontamination system 46 may optionally be connected or decoupled from the primary coolant circuit 12. The design and instrumentation of the external decontamination system 46 depends on whether and to which extent in-plant equipment can be resorted to during the decontamination.

In a preferred embodiment, the waste water treatment apparatus 10 according to the invention may be integrated into the external decontamination system 46 as well. One of the connection points 48, 50 may then preferably additionally serve as a discharge device 18.

Figure 2:
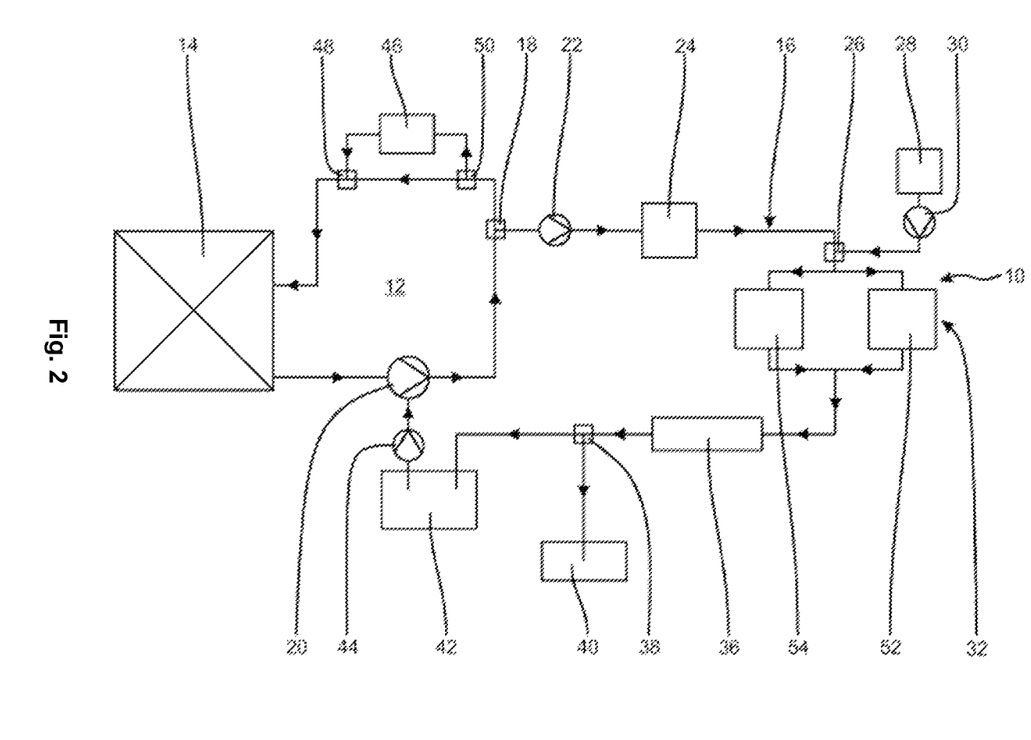
FIG. 2 shows another embodiment of a waste water treatment apparatus according to the invention having a stirred-tank reactor.

In the embodiment shown in FIG. 2, like reference numerals are used for components having the same function as in FIG. 1. Reference is made to the above description in this regard.

In the embodiment of FIG. 2, the reaction section 32 has a first stirred-tank reactor 52 in which the oxidizing agent is reacted with the reducing agent. In addition to the first stirred-tank reactor 52, a second stirred-tank reactor 54 is provided which is connected parallel to the first stirred-tank reactor 52. This arrangement enables intermittent operation of the stirred-tank reactors 52, 54, wherein the oxidizing agent is reacted with the reducing agent in one of the reactors while the other stirred-tank reactor is filled with the oxidation solution discharged from the primary coolant circuit 12. The volumes of the stirred-tank reactors 52, 54 are matched such that the residence time of the reaction solution in said one reactor required for the oxidizing agent to essentially completely react with the reducing agent is shorter than the time needed by said other reactor to be filled with the reaction solution.

Alternatively, the second stirred-tank reactor 54 may be configured as a simple buffer vessel that is connected to the first stirred-tank reactor 52 and receives the oxidation solution discharged from the primary coolant circuit 12 until the reaction of the oxidizing agent with the reducing agent in the stirred-tank reactor 52 has been completed. In this embodiment, the reducing agent can be added directly to the stirred-tank reactor 52.

Further, the stirred-tank reactor 52 may be operated continuously. In this case, the buffer vessel or the second stirred-tank reactor 54 may be omitted. The stirred-tank reactor 52 is then designed such that the volume flow rate of the reaction solution flowing through the stirred-tank reactor 52 results in a residence time that is sufficient for the oxidizing agent to essentially completely react with the reducing agent and yields a reaction solution freed of the oxidizing agent.

Below, a decontamination method in which the waste water treatment apparatus 10 according to the invention can be used is described first.

The decontamination of a metal surface in the primary coolant circuit 12 of a nuclear reactor 14 having a layer including one or more metal oxides and radioisotopes may be performed in one or more treatment cycles, each including an oxidation step, a reduction step and a decontamination step and optionally further treatment steps.

The oxidation step is performed by introducing an oxidizing agent into the primary coolant in the primary coolant circuit 12 to form an oxidation solution, which oxidation solution is circulated in the primary coolant circuit 12 to contact the oxidation solution with the metal surface. The oxidizing agent may be fed into the primary coolant using the external decontamination system 46 or the in-plant volume control system.

The oxidation solution may be circulated using at least the main coolant pump 20 and/or further coolant pumps present in the primary coolant circuit 12, which simultaneously serve as a heat source. The sealing tightness of the main coolant pump 20 and/or the further coolant pumps is ensured in the oxidation step through the supply with external seal water via the seal water pump 44. The seal water used in the oxidation step is deionized water, which is delivered from the main coolant pump 20 and/or the further coolant pumps into the primary coolant and thus increases the volume of the primary coolant during the oxidation step.

In the decontamination step, and optionally in other treatment steps, the treatment solution itself may serve as the seal water, or the treatment solution may be circulated by external pumps, for example the external decontamination system 46.

The concentration of the oxidizing agent in the oxidation solution is preferably in a range between 10 and 800 mg/l, preferably in a range from 100 to 300 mg/l.

The oxide layers deposited on the metal surface typically contain $Cr(III)$, $Fe(II)$ and $Fe(III)$ as well as $Ni(II)$ in a poorly soluble spinel structure. The contact with the oxidizing agent causes $Cr(III)$ and $Fe(II)$ in the oxide layer on the metal surface to be oxidized into $Cr(VI)$ and $Fe(III)$ and thus the spinel structure of the layer to be broken down. In this process, permanganate ($MnO_4^-$) employed as oxidizing agent is reduced to manganese dioxide ($MnO_2$). Cr(VI), being an easily soluble chromate, is dissolved in this phase, whereas Fe(III) and Ni(II) remain, for the most part as hydrated oxide, on the metal surface.

The oxidation step is a diffusion-controlled process, which is limited by the transport of fresh oxidizing agent to the metal surface and can therefore open up only a certain oxide layer thickness. If permanganate is used, the diffusion of the oxidizing agent to the metal surface is additionally slowed down by manganese dioxide forming on the surface with progressing oxidation time. This results in a continuous decrease in the formation of Cr(VI) over the treatment time. The oxidation step typically takes several hours and is completed when an increase in the concentration of Cr(VI) in the oxidation solution can no longer be observed.

In the decontamination method, the oxidation step is followed by a reduction step in which the residual oxidizing agent contained in the oxidation solution, and optionally the manganese dioxide formed when using permanganate, is reduced in the primary coolant circuit 12. The reducing agent employed is an aliphatic dicarboxylic acid, preferably oxalic acid.

If oxalic acid is used as the reducing agent, the general reaction equations are as follows:

$$2MnO_4^- + 5H_2C_2O_4 + 6H^+ \rightarrow 2Mn^{2+} + 10CO_2 + 8H_2O$$

$$MnO_2 + H_2C_2O_4 + 2H^+ \rightarrow Mn^{2+} + 2CO_2 + 2H_2O$$

The reduction with oxalic acid yields exclusively $CO_2$ and $H_2O$, wherein five moles of $CO_2$ are produced per mole of permanganate and two moles of $CO_2$ are produced per mole of manganese dioxide. The $CO_2$ created in the reduction step may, for example, be collected in a surge tank of the external decontamination system or in a low-pressure region of the primary coolant circuit 12 and may thence be fed to the exhaust air produced during operation of the nuclear reactor via a corresponding filter.

The reduction step is completed once the concentration of the oxidizing agent does not decrease any further and/or has fallen below a predetermined limit.

In the decontamination step which follows the reduction step, the metal surface treated in the oxidation step is contacted with a decontaminating agent to dissolve at least a part of the metal oxides and radioisotopes in the primary coolant to form a decontamination solution.

Oxalic acid may again be used as the decontaminating agent. The transition from the reduction step to the decontamination step in the primary coolant circuit 12 is therefore gradual.

If oxalic acid is used as the decontaminating agent, Cr(VI) is reduced to Cr(III) and remains in the decontamination solution as an oxalato complex. Any present Ni(III) is reduced to Ni(II) and dissolved as a Ni(II) oxalato complex, whereas iron is dissolved as a Fe(III) oxalato complex. Moreover, the decontamination solution also contains the radioisotopes leached from the oxide layer.

The metal ion containing decontamination solution is passed over a cation-exchange resin to bind the corrosion products Fe and Ni as well as the Mn from the oxidation step and the radioisotopes. Small amounts of the radioisotopes and the Cr(III) oxalato complex can be retained on an anion-exchange resin. Since the decontamination solution is constantly cleaned on ion-exchange resins, a recirculation of radioactivity into the coolant system is prevented and an effective reduction of the dosage impact in the current treatment cycle is achieved. The decontamination step in a treatment cycle is completed once a decrease in the activity of the decontamination solution can no longer be observed.

In the subsequent cleaning step, the decontaminating agent is removed from the decontamination solution cleaned of metal ions. If oxalic acid is used as the decontaminating agent, the oxalic acid can be decomposed into $CO_2$ and water through photocatalytic wet oxidation by means of UV-light. Parallel to this, the decontamination solution is still continuously passed over ion exchangers to remove residual activity and corrosion products. The removal of the reducing constituents from the decontamination solution serves for the preparation of the next treatment cycle and ensures the stability of the oxidizing agent employed in the following oxidation step.

At the end of the final treatment cycle, as soon as the desired reduction of the dose rate of the metal surface has been reached, the decontamination solution, which has been cleaned and freed of residual decontaminating agent, is cleaned by mixed-bed filters until it reaches a determined limiting conductivity.

The method according to the invention for treating waste water from the decontamination of a metal surface in the primary coolant circuit of a nuclear reactor using the waste water treatment apparatus 10 is described in detail below.

According to the invention, a predetermined amount of the oxidation solution formed in the oxidation step of the decontamination method described above is discharged from the primary coolant circuit 12 and is reacted with a reducing agent in the reduction zone 16 of the waste water treatment apparatus 10, which is connected to the primary coolant circuit. The conversion of the oxidation solution in the waste water treatment apparatus 10 can already be started during the oxidation step in the primary coolant circuit 12.

The predetermined amount of the oxidation solution discharged from the primary coolant circuit 12 corresponds to the amount of seal water that is fed to the coolant pumps, in particular the main coolant pump 20, and delivered into the primary coolant during the oxidation step. The volumetric flow rate of the oxidation solution flowing into the reduction zone 16 may in particular correspond to a volumetric flow rate of the seal water introduced into the primary coolant during the oxidation step. With the aid of the pump 22 and the flow meter 24, the flow velocity of the oxidation solution in the reduction zone 16 can be controlled.

The reducing agent is introduced into the oxidation solution in the reduction zone 16 by the dosing device 28 at the dosing station 26 and reduces the oxidizing agent in the reaction section 32 following the dosing station 26 to form a reaction solution freed of the oxidizing agent.

The reducing agents employed in the reduction zone 16 and in the reduction step of the decontamination method described above may be the same or different. It is preferred to use same reducing agents in both steps. The reducing agent used in the reduction zone 16 is preferably an aliphatic dicarboxylic acid, preferably oxalic acid.

The reducing agent causes the residual amount of oxidizing agent contained in the oxidation solution in the reduction zone 16, such as permanganate ($MnO_4^-$), and optionally manganese dioxide ($MnO_2$) introduced into the reduction zone 16, to be reduced to $Mn^{2+}$.

By using slightly over stoichiometric amounts of oxalic acid, it is possible to completely reduce the permanganate, and optionally the manganese dioxide, to Mn(II) in the reaction section 32 and to complex the latter to that it remains dissolved. Cr(VI) leached from the oxide layer is reduced to Cr(III) by the reducing agent and remains in the reaction solution as an oxalato complex.

Through the reaction with the oxidizing agent, the oxalic acid is converted into carbon dioxide $CO_2$ and water.

Outgassing of $CO_2$ from the reaction solution can be prevented by pressurizing the reduction zone 16 and/or the reaction section 32. This achieves a complete dissolution of the $CO_2$ in the reaction solution.

If a tubular-flow reactor 34 (FIG. 1) is used in the reaction section 32, it is preferred to set a sufficient overpressure until after the ion exchanger 36.

If a reaction vessel such as a stirred-tank reactor 52 is used (FIG. 2), the degassing may be performed in the reaction vessel and the main portion of the $CO_2$ may be fed to the exhaust air produced during operation of the nuclear power plant via a corresponding HEPA filter.

The volume of the reduction zone 16 is preferably adapted to the reaction time of the reaction of the oxidizing agent with the reducing agent, so that the residence time of the reaction solution in the reaction section 32 is sufficient to assure an essentially complete reaction of the oxidizing agent with the reducing agent in the reduction zone 16. The reaction time of the reaction of the oxidizing agent with the reducing agent can be ascertained experimentally. The volume of the reduction zone 16 and the residence time of the reaction solution in the reaction section 32 are determined depending on the amount and/or the volumetric flow rate of the external seal water introduced into the primary coolant during the oxidation step, so that an essentially constant amount of coolant can be maintained in the primary coolant circuit.

If a tubular-flow reactor 34 is used, the residence time of the oxidizing agent and the reducing agent in the tubular-flow reactor 34 can be controlled via the length of the tubular-flow reactor 34 and/or the flow velocity of the reaction solution to assure an essentially complete reaction of the oxidizing agent with the reducing agent in the tubular-flow reactor 34. A reaction solution that is freed of oxidizing agent then exits the tubular-flow reactor 34.

If a stirred-tank reactor 52 is used, the volume of the stirred-tank reactor can be dimensioned such that the residence time of the reaction solution in the reactor is sufficient for the oxidizing agent to essentially completely react with the reducing agent. The stirred-tank reactor 52 is preferably operated continuously. In the case of an intermittent operation, a buffer vessel or a further stirred-tank reactor 54 may additionally be provided the volumes of which are matched such that the complete conversion of the oxidizing agent is achieved in the reactor 52 while the other reactor 54 or the buffer vessel is filled with the oxidation solution discharged from the primary coolant circuit 12 into the reduction zone 16.

The reaction solution freed of the oxidizing agent is passed over an ion-exchange resin in the ion exchanger 36 for cleaning to form a desalinated solution. The Mn from the oxidation step and optionally corrosion products Fe and Ni dissolved in the reaction solution as well as radioactive material are bound on cation-exchange resin. Small amounts of the radioactive material and the Cr(III) can be bound on anion-exchange resin. The desalination may be performed completely so as to form deionized water or partially, preferably at least until a predetermined activity of the processed solution is achieved which allows disposal of the solution into the waste water.

The reaction solution freed of the oxidation medium may be cleaned of possible particles either prior to entering the ion exchanger 36 or subsequently via a filter.

Having been cleaned and desalinated in this manner, the solution can be passed to the seal water supply, where it is available as seal water for the main coolant pump 20 or further coolant pumps and can be returned into the primary coolant circuit 12. Additionally, or alternatively, the cleaned and desalinated solution can be disposed of completely or partially.

EXAMPLES

For execution of a waste water treatment on a laboratory scale it was assumed that the maximum concentration of permanganic acid in the oxidation solution is about 300 ppm (mg/kg). This concentration corresponds to the upper limit of the amount of oxidizing agent typically used in decontamination methods with permanganate and thus constitutes a conservative assumption.

The amount of oxidation solution to be treated corresponds to the amount of seal water needed in the oxidation step and depends on the number of coolant pumps that are in operation during the oxidation phase. If all four main coolant pumps in the primary coolant circuit are in operation simultaneously, the maximum amount of introduced seal water is 6 $m^3/h$.

The oxalic acid is fed into the reduction zone preferably in the form of a solution. The concentration of a stock solution of oxalic acid used for decontamination methods is about 100 g of oxalic acid dihydrate per 1 kg of water, which corresponds to 100 kg of oxalic acid dihydrate per cubic meter of water. At this concentration, a precipitation of oxalic acid is excluded for a temperature $T \geq 15°$ C.

The feed rate of the oxalic acid solution into the reduction zone depends on the concentration of permanganic acid in the oxidation solution and the amount of seal water. Under the maximum conditions assumed above, it is about 63.5 liters/h. This corresponds to the amount of oxalic acid that is stoichiometrically necessary to reduce permanganic acid in the oxidation solution to Mn(II) and to complex the latter. This avoids the formation of precipitations after the reduction. The feed rate of the oxalic acid can be newly ascertained and/or adapted in the case of a deviation from the above-mentioned initial parameters. Moreover, a fine adjustment of the feed rate can be performed during execution of the waste water treatment through conductivity measurements upstream of the ion-exchange column.

The required length of the hose that serves as a continuous tubular-flow reactor depends on the hose diameter used, the residence time needed for the completion of the reaction, and the flow velocity. A diameter DN 80 typically used for decontamination hoses was selected as the hose diameter. Under the stated conditions and at temperatures $T \geq 85°$ C. to 95° C., the maximum reaction time for the reaction of permanganic acid with oxalic acid is 2 minutes. Considering the maximum amount of introduced seal water of 6 $m^3/h$, this results in a required hose length of about 40 m.

The parameters calculated above were tested on a pilot plant scale. Instead of a hose diameter DN 80, a hose having a diameter of DN 25 was used for the pilot plant tests. The hose length of 40 m was maintained. The flow velocity was set to 500 liters/h to achieve the same residence time of the reaction solution. The measured residence time of the reaction solution in the hose was two minutes and three seconds (02:03) with a standard deviation of nine seconds (00:09). The flow velocity-adjusted feed rate of the oxalic acid solution was 5.25 liters/h. Other process parameters such as the concentration of the permanganic acid or the reaction temperature remained unchanged. A colorless solution freed of permanganate was obtained at the outlet of the hose that was used as the tubular-flow reactor.

The feasibility of the reduction of permanganic acid in a hose serving as a tubular-flow reactor could thus be proven. It was confirmed that the calculated residence time was sufficient to achieve a complete reduction of the permanganic acid. The ions that remain dissolved indicate an ion exchanger demand of about 250 liters per 100 cubic meters of permanganic acid solution at the end of the oxidation step.

One advantage of the conditioning of the oxidation solution through reduction with oxalic acid in a tubular-flow reactor as described here is that the volume of the produced waste and the effort of carrying out the reduction reaction are small compared with the treatment of the waste waters from decontamination methods using an evaporator according to the prior art.

The invention is thus particularly useful for nuclear facilities that lack sufficient evaporator capacity for handling the amount of waste water produced in a full system decontamination and for heavy-water reactors in which a removal of large amounts of heavy water in a range of several hundred cubic meters during a system decontamination is not economical.

The invention claimed is:

1. A waste water treatment apparatus for treating waste water from decontamination of a metal surface in a primary coolant circuit of a nuclear reactor, said apparatus comprising:
    a discharge device provided for discharging a predetermined amount of a primary coolant comprising an oxidizing agent from the primary coolant circuit,
    a reduction zone that is connected to the discharge device and comprises a dosing station for introducing a reducing agent into the predetermined amount of the primary coolant discharged from the primary coolant circuit, and which reduction zone is provided for the reaction of the reducing agent with the oxidizing agent in the primary coolant to form a reaction solution, and
    an ion exchanger connected to the reduction zone for deionizing the reaction solution.

2. The waste water treatment apparatus according to claim 1, characterized in that the primary coolant circuit comprises at least one coolant pump with a seal water supply.

3. The waste water treatment apparatus according to claim 1, characterized in that the reduction zone comprises a reaction vessel.

4. The waste water treatment apparatus according to claim 3, characterized in that the reaction vessel is a stirred-tank reactor.

5. The waste water treatment apparatus according to claim 4, characterized in that the reduction zone further comprises a buffer vessel connected to the stirred-tank reactor.

6. The waste water treatment apparatus according to claim 3, characterized in that the reaction vessel comprises a tubular-flow reactor.

7. The waste water treatment apparatus according to claim 6, characterized in that the tubular-flow reactor has a length such that a residence time of the reaction solution in the tubular-flow reactor is achieved in which the oxidizing agent essentially completely reacts with the reducing agent.

8. The waste water treatment apparatus according to claim 1, characterized in that the nuclear reactor is constructed as a pressurized-water reactor, a boiling-water reactor or a heavy-water reactor.

9. A method for treating waste water from decontamination of a metal surface in a primary coolant circuit of a nuclear reactor with a waste water treatment apparatus according to claim 1, characterized in that the method comprises steps for:
    a) introducing an oxidizing agent into the primary coolant in the primary coolant circuit to form an oxidation solution, and circulating the oxidation solution in the primary coolant circuit to contact the oxidation solution with the metal surface;
    b) during or after step a), discharging a predetermined amount of the oxidation solution from the primary coolant circuit into the reduction zone connected to the primary coolant circuit;
    c) in the reduction zone, reacting the oxidizing agent with a reducing agent to form a reaction solution freed of the oxidizing agent;
    d) passing the reaction solution over an ion exchange resin in the ion exchanger to form a desalinated solution; and
    e) returning the desalinated solution to the primary coolant and/or temporarily storing and/or disposing of the desalinated solution.

10. The method of claim 9, characterized in that the oxidizing agent is a permanganate.

11. The method according to claim 9, characterized in that the reducing agent is an aliphatic dicarboxylic acid.

12. The method according to claim 9, characterized in that the primary coolant circuit comprises at least one coolant pump with a seal water supply, and that the oxidation solution is circulated in the primary coolant circuit using the coolant pump.

13. The method according to claim 12, characterized in that seal water is fed to the coolant pump and delivered into the primary coolant, wherein the predetermined amount of oxidation solution discharged from the primary coolant circuit corresponds to the amount of seal water delivered into the primary coolant.

14. The method according to claim 12, characterized in that a volumetric flow rate of the oxidation solution discharged into the reduction zone corresponds to a volumetric flow rate of the seal water delivered into the primary coolant during step a).

15. The method according to claim 9, characterized in that the reaction solution has a residence time in the reduction zone that is adapted to a reaction time of the reaction of the oxidizing agent with the reducing agent to achieve an essentially complete reaction of the oxidizing agent with the reducing agent in the reduction zone.

16. The method according to claim 9, characterized in that the reduction zone comprises a tubular-flow reactor, wherein the oxidizing agent and the reducing agent have a residence time in the tubular-flow reactor that is controlled to achieve an essentially complete reaction of the oxidizing agent with the reducing agent in the tubular-flow reactor.

17. The method according to claim 9, characterized in that the reduction zone is pressurized if required to prevent outgassing of carbon dioxide.

18. The method according to claim 9 for treating waste water from decontamination of a metal surface in a primary coolant circuit of a nuclear reactor, said method comprising:
    a) introducing an oxidizing agent into a primary coolant in the primary coolant circuit to form an oxidation solution and circulating the oxidation solution in the primary coolant circuit to contact the oxidation solution with the metal surface;

b) during or after step a), discharging a predetermined amount of the oxidation solution through a discharge device of a waste water treatment apparatus, wherein said apparatus comprises said discharge device, a reduction zone connected to the discharge device, said reduction zone comprising a dosing station for introducing a reducing agent into the reduction zone, and an ion exchanger connected to the reduction zone for deionizing the reaction solution, c) reacting in the reduction zone the oxidizing agent with a reducing agent to form a reaction solution freed of the oxidizing agent;

d) passing the reaction solution over an ion-exchange resin to form a desalinated solution; and e) returning the desalinated solution to the primary coolant and/or temporarily storing and/or disposing of the desalinated solution.

19. The method according to claim 18 for decontamination of a metal surface in a primary coolant circuit of a nuclear reactor having a layer including one or more metal oxides and radioisotopes, wherein the method comprises one or more treatment cycles, each treatment cycle comprising:

an oxidation step in which an oxidizing agent is introduced into a primary coolant in the primary coolant circuit to form an oxidation solution, which oxidation solution is circulated in the primary coolant circuit to contact the oxidation solution with the metal surface;

a reduction step in which a reducing agent is introduced into the oxidation solution and the oxidizing agent in the oxidation solution is reduced; and a decontamination step, wherein the metal surface treated in the oxidation step is contacted with a decontaminating agent to dissolve at least a part of the metal oxides and radioisotopes in the primary coolant to form a decontamination solution, wherein a predetermined amount of the oxidation solution formed in the oxidation step is discharged into the waste water treatment apparatus.

* * * * *